United States Patent
Redden et al.

(10) Patent No.: US 12,530,869 B2
(45) Date of Patent: Jan. 20, 2026

(54) AUTOMATED PLANT DETECTION USING IMAGE DATA

(71) Applicant: Deere & Company, Moline, IL (US)

(72) Inventors: Lee Kamp Redden, Palo Alto, CA (US); Christopher Grant Padwick, Menlo Park, CA (US); Rajesh Radhakrishnan, Mountain View, CA (US); James Patrick Ostrowski, Mountain View, CA (US)

(73) Assignee: Deere & Company, Moline, IL (US)

( * ) Notice: Subject to any disclaimer, the term of this patent is extended or adjusted under 35 U.S.C. 154(b) by 325 days.

(21) Appl. No.: 18/352,168

(22) Filed: Jul. 13, 2023

(65) Prior Publication Data

US 2024/0020951 A1   Jan. 18, 2024

Related U.S. Application Data

(63) Continuation of application No. 17/378,658, filed on Jul. 17, 2021, now Pat. No. 11,748,976, which is a
(Continued)

(51) Int. Cl.
*G06T 7/00* (2017.01)
*A01M 7/00* (2006.01)
(Continued)

(52) U.S. Cl.
CPC ......... *G06V 10/764* (2022.01); *A01M 7/0089* (2013.01); *G06F 18/2414* (2023.01);
(Continued)

(58) Field of Classification Search
CPC .. G06V 10/764; G06V 10/255; G06V 10/451; G06V 20/188; G06V 20/20;
(Continued)

(56) References Cited

U.S. PATENT DOCUMENTS

| | | | |
|---|---|---|---|
| 5,253,302 A | 10/1993 | Massen | |
| 5,668,719 A | 9/1997 | Bobrov et al. | |

(Continued)

FOREIGN PATENT DOCUMENTS

| | | | |
|---|---|---|---|
| CN | 1945601 A | 4/2007 | |
| CN | 103870816 A | 6/2014 | |

(Continued)

OTHER PUBLICATIONS

European Patent Office, Extended European Search Report, European Patent Application No. 24185446.2, Nov. 4, 2024, eight pages.
(Continued)

*Primary Examiner* — Huy C Ho
(74) *Attorney, Agent, or Firm* — Fenwick & West LLP

(57) ABSTRACT

A plant treatment platform uses a plant detection model to detect plants as the plant treatment platform travels through a field. The plant treatment platform receives image data from a camera that captures images of plants (e.g., crops or weeds) growing in the field. The plant treatment platform applies pre-processing functions to the image data to prepare the image data for processing by the plant detection model. For example, the plant treatment platform may reformat the image data, adjust the resolution or aspect ratio, or crop the image data. The plant treatment platform applies the plant detection model to the pre-processed image data to generate bounding boxes for the plants. The plant treatment platform then can apply treatment to the plants based on the output of the machine-learned model.

20 Claims, 12 Drawing Sheets

Related U.S. Application Data continuation of application No. 15/975,092, filed on May 9, 2018, now Pat. No. 11,093,745.

(60) Provisional application No. 62/580,290, filed on Nov. 1, 2017, provisional application No. 62/503,770, filed on May 9, 2017.

(51) Int. Cl.

| | | |
|---|---|---|
| *G06F 18/2413* | (2023.01) | |
| *G06T 7/73* | (2017.01) | |
| *G06V 10/20* | (2022.01) | |
| *G06V 10/44* | (2022.01) | |
| *G06V 10/764* | (2022.01) | |
| *G06V 20/10* | (2022.01) | |
| *G06V 20/20* | (2022.01) | |

(52) U.S. Cl.
CPC .............. *G06T 7/0002* (2013.01); *G06T 7/75* (2017.01); *G06V 10/255* (2022.01); *G06V 10/451* (2022.01); *G06V 20/188* (2022.01); *G06V 20/20* (2022.01); *G06T 2207/10024* (2013.01); *G06T 2207/20081* (2013.01); *G06T 2207/20084* (2013.01); *G06T 2207/20132* (2013.01); *G06T 2207/30188* (2013.01); *G06T 2210/12* (2013.01)

(58) Field of Classification Search
CPC .............. A01M 7/0089; G06F 18/2414; G06T 7/0002; G06T 7/75; G06T 2207/10024; G06T 2207/20081; G06T 2207/20084; G06T 2207/20132; G06T 2207/30188; G06T 2210/12
USPC ........................................................ 382/110
See application file for complete search history.

(56) References Cited

U.S. PATENT DOCUMENTS

| | | | |
|---|---|---|---|
| 6,191,842 B1 | 2/2001 | Navarro | |
| 6,930,710 B1 | 8/2005 | Classen et al. | |
| 7,424,133 B2 | 9/2008 | Schultz et al. | |
| 8,693,778 B1 | 4/2014 | Landwehr et al. | |
| 2005/0271292 A1 | 12/2005 | Hekkers | |
| 2009/0153659 A1 | 6/2009 | Landwehr et al. | |
| 2010/0268562 A1 | 10/2010 | Anderson | |
| 2012/0113225 A1* | 5/2012 | Deppermann | ........... A01G 7/00 |
| | | | 382/110 |
| 2013/0235183 A1 | 9/2013 | Redden | |
| 2014/0168412 A1 | 6/2014 | Shulman et al. | |
| 2015/0015697 A1 | 1/2015 | Redden et al. | |
| 2015/0027040 A1 | 1/2015 | Redden | |
| 2016/0307329 A1 | 10/2016 | Isler et al. | |
| 2017/0061211 A1* | 3/2017 | Hundley | .............. G06V 10/143 |
| 2017/0206415 A1 | 7/2017 | Redden | |
| 2017/0223947 A1* | 8/2017 | Gall | ................... G01N 21/4738 |
| 2018/0022208 A1 | 1/2018 | Calleija et al. | |

FOREIGN PATENT DOCUMENTS

| | | |
|---|---|---|
| CN | 104243951 A | 12/2014 |
| CN | 104361342 A | 2/2015 |
| CN | 104535575 A | 4/2015 |
| EP | 3316673 A1 | 5/2018 |
| WO | WO 2015/006675 A2 | 1/2015 |
| WO | WO 2016/025848 A1 | 2/2016 |
| WO | WO 2016/090414 A1 | 6/2016 |
| WO | WO 2016/123656 A1 | 8/2016 |
| WO | WO 2016/191825 A1 | 12/2016 |
| WO | WO 2017/214686 A1 | 12/2017 |

OTHER PUBLICATIONS

China National Intellectual Property Administration, Office Action, CN Patent Application No. 201880030347.7, Feb. 15, 2022, 29 pages.
China National Intellectual Property Administration, Office Action, CN Patent Application No. 201880030347.7, Jun. 9, 2021, 23 pages.
Liu, W., et al., "SSD: Single Shot MultiBox Detector," European Conference on Computer Vision ECCV 2016: Computer Vision—ECCV 2016, pp. 21-37, Can be retrieved at <URL: http://www.cs.unc.edu/.about.wliu/papers/ssd.pdf>.
PCT International Search Report and Written Opinion, PCT Application No. PCT/US2018/031841, Jul. 31, 2018, 24 pages.
PCT International Search Report and Written Opinion, PCT Application No. PCT/US2018/031845, Jul. 30, 2018, 18 pages.
United States Office Action, U.S. Appl. No. 15/975,066, filed Mar. 18, 2020, 18 pages.
United States Office Action, U.S. Appl. No. 15/975,092, filed Jun. 5, 2020, 13 pages.
United States Office Action, U.S. Appl. No. 15/975,092, filed Nov. 12, 2020, 23 pages.
United States Office Action, U.S. Appl. No. 15/975,092, filed Nov. 15, 2019, 11 pages.
United States Office Action, U.S. Appl. No. 17/378,658, filed Dec. 7, 2022, 28 pages.

* cited by examiner

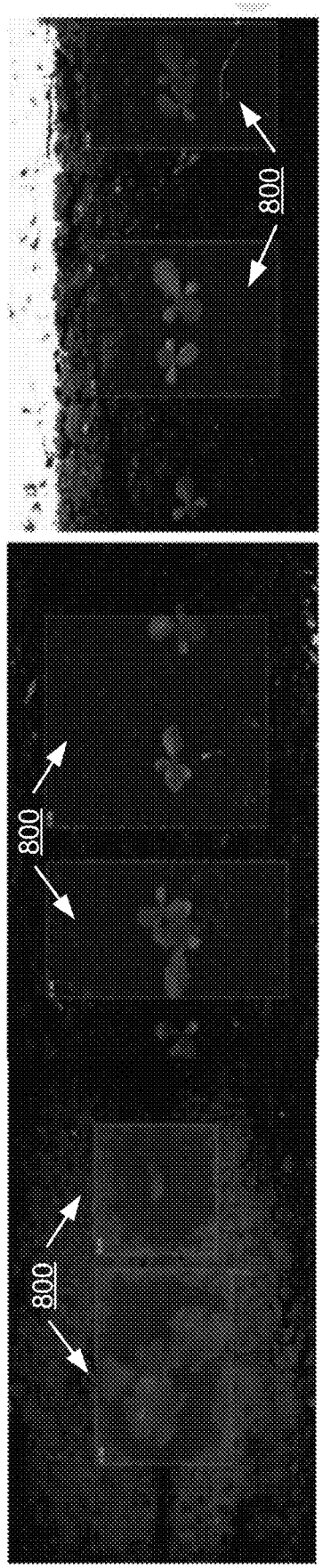

AUTOMATED PLANT DETECTION USING IMAGE DATA

CROSS REFERENCE TO RELATED APPLICATION

This application is a continuation of U.S. patent application Ser. No. 17/378,658 filed Jul. 17, 2021, now U.S. Pat. No. 11,748,976, which is a continuation of U.S. patent application Ser. No. 15/975,092 filed May 9, 2018, now U.S. Pat. No. 11,093,745, which claims the benefit of U.S. Provisional Patent Application No. 62/503,770 filed May 9, 2017, and U.S. Provisional Patent Application No. 62/580,290 filed Nov. 1, 2017, the subject matter of each are hereby incorporated by reference in their entirety.

BACKGROUND

Conventional systems for treating crops in a field broadly apply treatment to all plants in the field, or to entire zones of plants within a field. For example, a plant treatment system can use a sprayer that evenly treats all plants in a field or zone with the same treatment without individualized plant consideration. These systems have significant drawbacks. One major drawback in the case of a spray type treatment is that treatment fluid is traditionally liberally applied throughout the zone or field, resulting in significant waste. Particularly for fertilizer treatments, the excess treatment of a nitrogen-containing fertilizer is harmful to environment in aggregate. Further, in such systems, crops and weeds are treated with fertilizers or other beneficials equally, unless separate effort is expended to remove weeds before treatment. Such manual effort is expensive and time consuming, and does not necessarily result in the removal of all weeds.

To achieve precision application of plant treatment, farmers may manually apply treatment to plants. However these methods are exceptionally labor-intensive and therefore costly, particularly for any form of modern farming performed at scale.

SUMMARY

A mobile treatment platform uses a plant detection model to detect and identify plants in image data captured by a camera on the mobile treatment platform as the platform travels through a field of crops. Specifically, the model is capable of distinguishing between crops and weeds generally, and more specifically is able to distinguish between a number of varieties of plants and a number of varieties of the weeds. The mobile treatment platform receives image data from the camera and applies pre-processing functions to the image data. The pre-processing functions may perform any one of a number of functions, such as adapting the image data to be consistent with image data used to train the plant detection model, and/or improving the ultimate specificity, sensitivity, and/or efficiency of the plant detection model. Examples of pre-processing that can be performed include, but are not limited to, debayering, cropping, white balancing, resizing, exposure control, or value normalization.

In one embodiment, the plant detection model is configured to generate bounding boxes enclosing portions of the image data that the model has identified represent different plants. The model associates bounding boxes with a predicted plant species (also referred to herein as the "type" of plant) and a measure of confidence.

The plant detection model can also be used to detect areas where the mobile treatment platform has already treated plants. For example, if the mobile treatment platform applies a liquid treatment to plants, the plant detection model can generate bounding boxes that describe portions of the image data that represent areas that have already been treated by the mobile treatment platform and/or those areas that have not.

The plant detection model can be generated using a variety of machine-learning tools including, but not limited to, neural networks, support vector machines, and decision trees. In one embodiment, the plant detection model is a modified version of the Single Shot MultiBox Detector (SSD) neural network. In this embodiment, the plant detection model is modified from the "baseline" SSD neural network to improve the specificity, sensitivity, and/or efficiency of the plant detection model. In various implementations, the modified SSD model may include, but is not limited to, any of the following processing techniques: batch normalization, leaky rectified linear units, residual neural networks, custom anchor boxes, cleaned labeled data, increased spatial resolution on feature maps, spatial transformers, training loss optimization, weighted softmax, feature map fusion, background mining, training augmentations, and uncertainty-based retraining.

The mobile treatment platform uses the output of the plant detection model to control treatment of plants in the field as the mobile treatment platform travels through the field. For example, the mobile treatment platform may use the locations of bounding boxes identifying individual crop plants within the image data to target the application of a fertilizer to those crop plants. Similarly, the mobile treatment platform may use the locations of bounding boxes identifying individual weed plants within the image data to apply an herbicide to those weed plants. To achieve this plant-level specificity, the mobile treatment platform may include appropriate on-board hardware to store treatment materials and apply them at a plant-specific level of granularity.

The mobile treatment platform, including the plant detection model, allows for the rapid determination of the location of individual plants in order to effect appropriate individual plant treatments. This allows the mobile treatment platform to localize treatment to individual plants rather than treating the whole field, without the downside of requiring excess manual labor and/or while avoiding the overuse of treatment materials.

BRIEF DESCRIPTION OF THE DRAWINGS

FIGS. 8A, 8B, and 8C illustrate an example implementation of a plant detection model identifying bounding boxes for treated patches of soil on dark soil, light soil, and with the leaking of light underneath a shroud used to normalize light in each case, in accordance with one embodiment.

DETAILED DESCRIPTION

I. Mobile Treatment Platform

Figure 1:
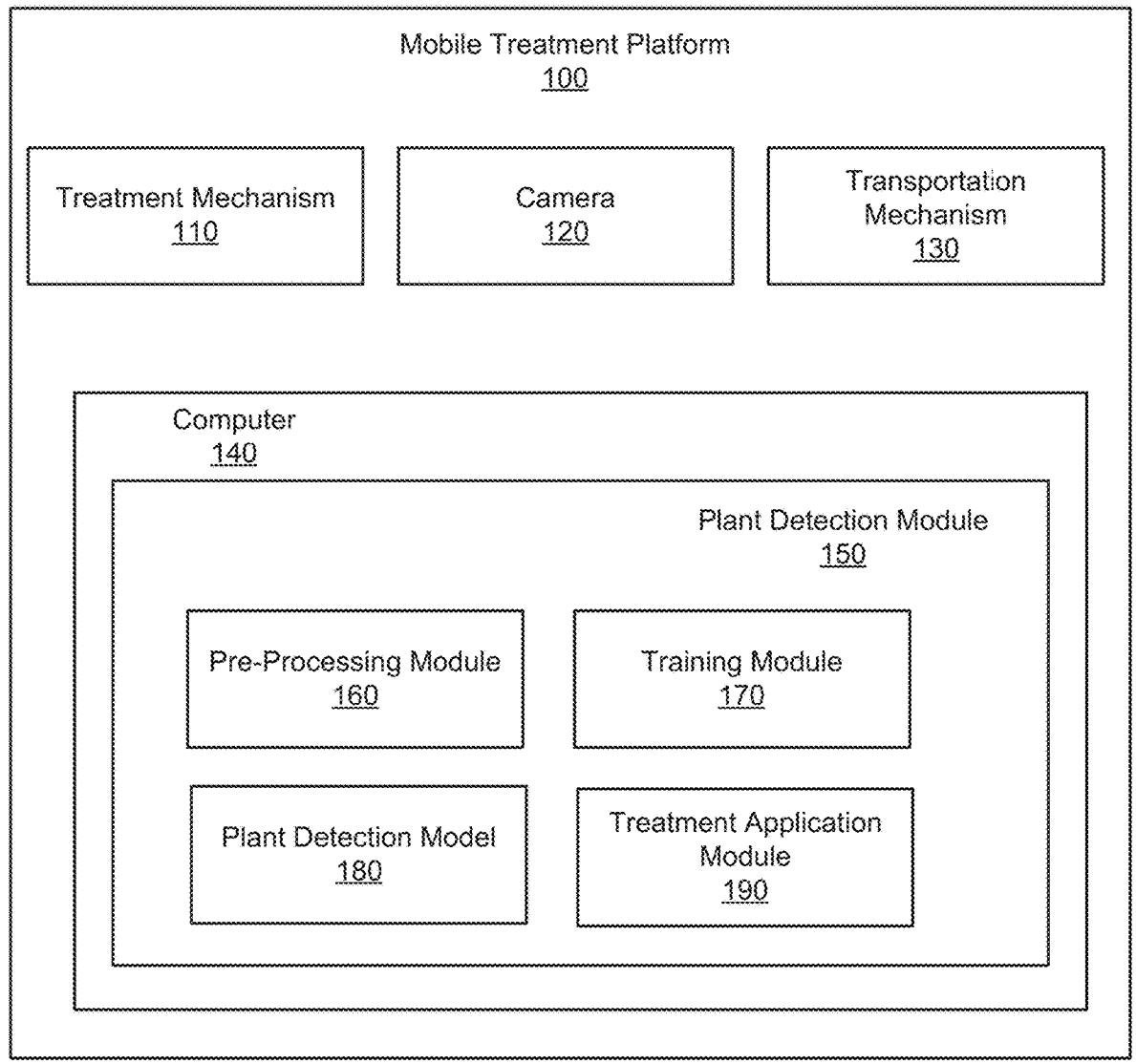
FIG. 1 illustrates a system architecture for an example mobile treatment platform, in accordance with one embodiment.

FIG. 1 illustrates a system architecture for an example mobile treatment platform 100, in accordance with some embodiments. The mobile treatment platform 100 includes a treatment mechanism 110, a camera 120, a transportation mechanism 130 configured to move the entire platform 100 through the field, and a computer 140. Although only single instances of these elements are shown and described, in practice the platform 100 may contain more than one of each such element.

The treatment mechanism 110 applies a treatment to plants within a field while the mobile treatment platform 100 is traveling through the field. For example, the treatment mechanism 110 may include one or more sprayers and one or more containers that hold treatment fluids to be applied to plants via the treatment mechanism 110. Fluid treatments can include, but are not limited to, fertilizer, herbicide, pesticide, fungicide, insecticide, and growth regulators. The treatment mechanism 110 also can include sheers or other cutting mechanisms for pruning crops, high-pressure water jets for pruning or removing crops or weeds, and electrodes for applying an electrical discharge to crops and weeds.

The treatment mechanism 110 receives treatment instructions from the computer 140 and treats plants based on the treatment instructions. The treatment instructions may come in the variety of forms, and may include timing instructions for activating and deactivating the treatment mechanism 110. For example, the treatment mechanism 110 may activate a particular sprayer upon receiving an activation signal from the computer 140 and may deactivate the sprayer upon receiving deactivation signal. As another example, the treatment mechanism 110 may receive times of activation and deactivation, and the treatment mechanism 110 may use an internal clock or other timing mechanism to determine when to activate and deactivate based on the received times.

The treatment instructions may also include directional instructions specifying a direction for the treatment mechanism 110. As an example, directional instructions may be specified in Cartesian, polar, or other coordinates. The directional instructions may be coded so as to indicate a positioning/orientation of the treatment mechanism 10, or they may be coded so as to indicate where a treatment should be applied, with the treatment mechanism 110 configured to translate the instructions to determine how the treatment mechanism 110 will be re-positioned/re-oriented to effect the treatment. Accordingly, the treatment mechanism 110 may be appropriately configured to translate, rotate, or otherwise be manipulated to effect the treatment at the location specified by the directional instructions. For a sprayer, this may include rotating and/or translating the sprayer to have the spray hit an area dictated by the treatment instructions.

The camera 120 is physically positioned on the platform 100 to capture image data of plants within the field, and generally based on positioning also captures some of the soil in which the plants are planted. The camera 120 captures the image data as the platform is physically moving through the field. The image data includes still images, however the rate of capture may vary and in practice the images may be captured at a sufficient rate so that they may be used and processed as video data, if desired. The rate of capture may vary, the camera 120 may capture image data at a particular rate, either based on time or after the platform 100 has traveled a fixed physical distance. Alternatively, the camera 120 may capture a new image/set of image data each time a new plant enters the field of view of the camera.

A wide variety of cameras with different capabilities and light spectra captured may be used. Examples include, but are not limited to, RGB cameras, near infrared (e.g., red edge or short wave infrared) cameras, ultraviolet cameras, and multi-spectral cameras. The cameras generally use CMOS digital image sensors, but may also be CCD image sensors. More than one camera 140 may be used, such as a first camera located in front of the treatment mechanism 110 along the direction of travel, and a second camera located after the treatment mechanism 110 along the direction of travel of the transportation mechanism 130. The camera/s can capture image data from the top-down perspective, from the side perspective, or from an angled perspective.

The transportation mechanism 130 moves the mobile treatment platform 100 through the field. The transportation mechanism 130 may be a motor vehicle with wheels. Alternately, the transportation mechanism 130 may include a hitch that allows the mobile treatment platform 100 to be attached to a separate vehicle to be towed through the field. The transportation mechanism 130 may further include an odometer that allows the mobile treatment platform 100 to determine the distance the mobile treatment platform has traveled 100.

The computer 140 provides computational capabilities to the mobile treatment platform 100. The computer 140 can comprise a processing unit (e.g., one or more of a CPU, a GPU, or an FPGA) and a data storage medium (e.g., static or dynamic memory). In one embodiment, the computer 140 comprises a deep-learning GPU that is configured to effectively execute a deep-learning neural network. For example, the computer 140 may include an NVIDIA GeForce® GTX™ TITAN X using the Caffe deep learning framework or the NVIDIA Tx1 or Tx2 using the Tensorflow deep learning framework.

The computer 140 may also include communicative elements such as buses, input/output terminals and other computer hardware sufficient to communicatively couple to and control the operation of one or more of the treatment. More specifically, the image data passed in to the computer instructions may be transmitted to the computer 140 for processing using any type of transmission protocol. For example, the open systems interconnect (OSI) model may be used to send image data from the camera 120 to the computer 140 using ethernet connections between these components. Instructions generated by the computer 140 may then be transmitted to the treatment mechanisms 110 using ethernet connections, Controller Area Network bus connections, or another transmission protocol.

The computer 140 stores computer program instructions that describe a number of logical components that dictate the carrying out the tasks that the platform 100 is able to accomplish. Examples of such tasks include, but are not limited to capturing image data, processing the image data and other data to generate a treatment instruction, and using the output of the plant detection model to control the treatment mechanism 110 with the treatment instructions. Despite the name "plant detection module," this includes both crop/weed detection as well spray location detection as introduced above. In one embodiment, these logical components include a plant detection module 150 which itself includes a pre-processing module 160, a training module 170, a plant detection model 180, and a treatment application module 190. However, additional, fewer, or different modules may be included in other embodiments.

In one particular embodiment, the plant detection module 150 communicates with a remotely located computer server (not shown) not physically present within the computer 140 of the platform and some or all of the functionality of the plant detection module 150 is performed by the server. In such an embodiment, image data and any other relevant data such as the rate and direction of travel of the transportation mechanism 130 is relayed to the remote server and treatment instructions are relayed back to the computer 140 for execution by the treatment mechanism 110.

The plant detection module 150 uses a trained detection model 180 to detect and classify plants or portions of plants, bounding boxes, and spray patterns, and may also be configured to detect other items present in images such as plant residue, or dirt clots. The plant detection module 150 is described further below.

II. Plant and Spray Pattern Detection

II.A. Image Data Preprocessing

The pre-processing module 160 pre-processes image data received from the camera 120. The pre-processing module 160 can pre-process training image data in preparation for training the plant detection model 180, as well as for image data collected in the field for actual use of the plant detection model 180. Listed below are some example pre-processing steps that the plant detection model 180 may apply to the image data. In various embodiments, any one or more of these techniques may be used to pre-process image data for either model training or model use.

Debayering: The pre-processing module 160 may debayer the image data using pixel values received directly from the image sensor of the camera. The pre-processing module 160 may use any one of a variety of techniques for performing the debayering, examples of which include but are not limited to Nearest Neighbor, Linear Interpolation, Cubic Interpolation, High Quality Linear Interpolation, and Smooth Hue Transition Interpolation. In some embodiments, the pre-processing module 160 debayers the image data by passing raw A2D values in the image data through a built-in FPGA that returns a 24-bit RGB color corrected value from 10-bit A2D values. The pre-processing module 160 may perform the debayering of the image data through pixel binning, which itself may any one of analog binning, interpolation binning, or post-analog-to-digital conversion binning. Alternatively, pixel binning may be performed on the camera 120 before the pixel values are output from the camera 140.

Cropping: The pre-processing module 160 may crop the image data to control the sizes of the images being processed by the plant detection model 180. The pre-processing module 160 may crop the image data to remove portions of the image data that are unlikely to be related to a given task. For example, if the platform is traveling along a row of crops (e.g., between or over the crops), the pre-processing module 160 can crop image data captured a threshold distance outside the rows and/or a threshold distance expected growth area of relevant crops or weeds. The underlying assumption is that the cropped portions are likely to be irrelevant to the detection of crops and weeds. In some embodiments, the pre-processing module 160 crops the image data by cropping sensor data from sensors of the camera before the sensor data is converted to image data.

Figure 2:
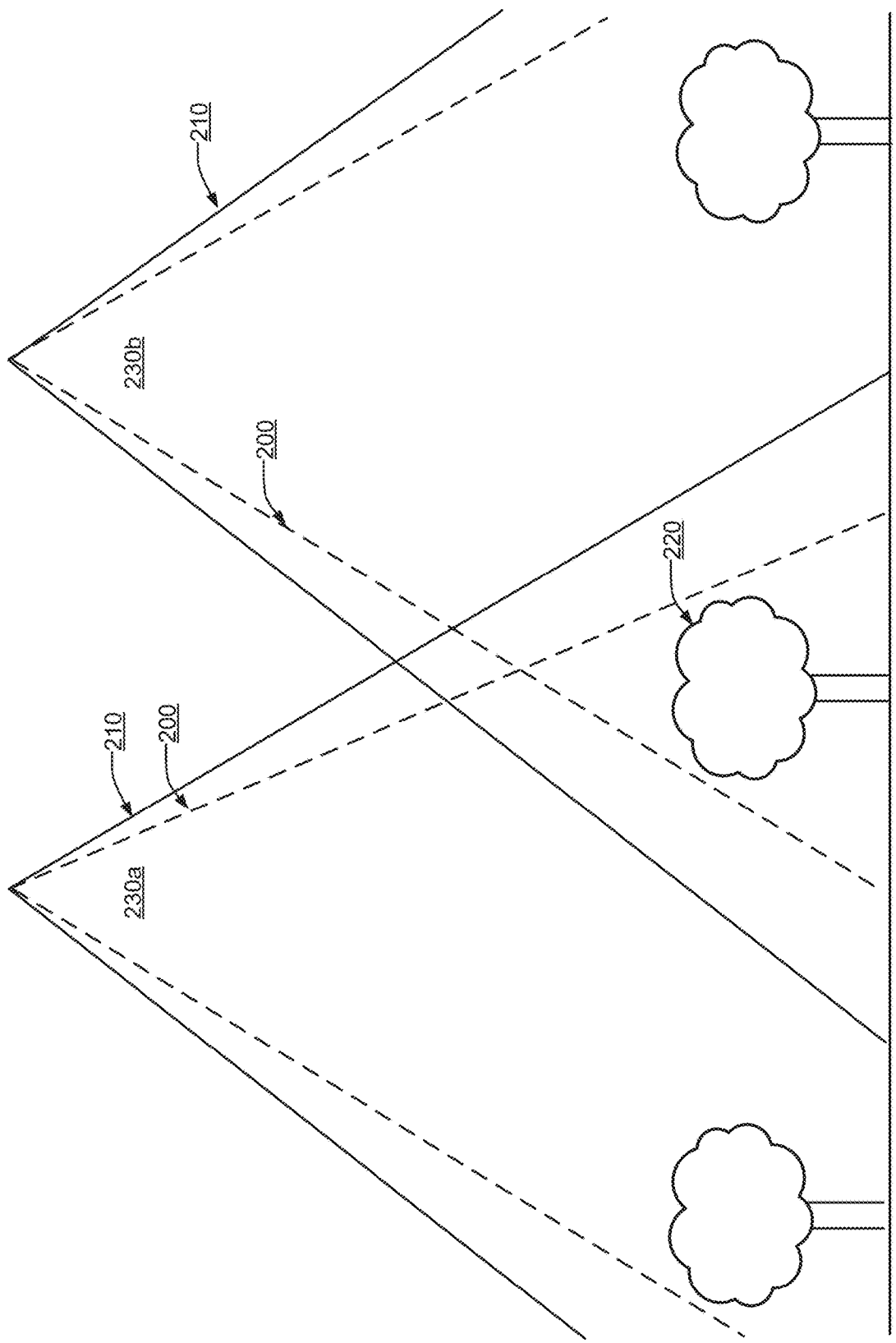
FIG. 2 illustrates a cropping of original image data, in accordance with one embodiment.

FIG. 2 illustrates a cropping 200 of original image data 210 that reduces the amount of image data processed by the plant detection model 180 while, at the same time, ensuring that the entirety of the plant 220 is captured, in accordance with one embodiment. FIG. 2 illustrates the successive capture of multiple images 230 as the platform passes along the row. While FIG. 2 illustrates an example capture volume for an example camera (not shown), other implementations where the camera and platform pass alongside the row are also possible. The pre-processing module 160 can crop the image data so as to ensure that no blind spots occur in a capture area. The pre-processing module 160, and the platform's 100 physical infrastructure more generally, may accomplish this using by taking into account a variety of either fixed constraints or variable parameters, examples of which include but are not limited to an expected crop height or crop height range (e.g., anywhere from 0 to 12 inches high), a fixed or controllable camera position (e.g., height above the ground, geometry, and orientation relative to the plane of the ground), a variable rate of travel (e.g., a range of 0 to 6 miles per hour, or greater), and a variable camera shutter speed which may vary along with other camera parameters such as the image sensor gain.

White Balancing: The pre-processing module 160 can white-balance image data to normalize the colors of the captured image. The pre-processing module 160 can white balance the image data based on any one or more of a number of factors, examples of which include but are not limited to: the time of day the image data was taken, whether artificial lighting was used to capture the image data, and whether a shroud (cover) was used to block or diffuse sunlight. This ensures a consistent white balance for images regardless of the circumstances in order to ensure consistent processing by the plant detection model 180.

Resizing: The pre-processing module 160 resizes image data to ensure that each instance ("image") of image data stores a fixed resolution of pixels per given geographic area. For example, the pre-processing module 160 may resize images to ensure a constant pixel-per-inch (PPI) across images. For example, this may include downsampling or upsampling the image data to decrease or increase the PPI. Resizing may be performed for a number of reasons. For example, the image data received from a camera 120 mounted on one platform may not have the same PPI as image data originally used to train the plant detection model 180. This may occur when the configuration of the camera 120 on the mobile treatment platform 100 is different from the configuration used to capture training image data. For example, if the camera can be positioned at one of multiple different heights in different "runs" of the platform over the field or over different fields, the pre-processing module 160 can resize the image (along with one or more of the other techniques mentioned in this section) to ensure a consistent PPI for images fed into the plant detection model 180 from those separate runs.

Exposure Control: The pre-processing module 160 may adjust the exposure of the image data. As with white balance, the pre-processing module 160 adjusts the exposure to ensure uniformity, to the extent possible, of exposure across images collected within a given "run" through a field, as well as across runs. The pre-processing module 160 may adjust exposure related parameters of the camera 120 dynamically as the platform passes through the field or may adjust the exposure of the image data algorithmically after the image data is captured. Examples of camera parameters that may be adjusted to control exposure include, but are not limited to, shutter speed and gain control on the image sensor of the camera 120.

Value Normalization: The pre-processing module 160 can normalize the values of the image data pixels to reduce biases when the images are input into the plant detection model 180 for use or training. For example, the pre-processing module 160 may adjust the pixel values (e.g., individual RGB values for particular pixels) to be zero mean and have a unit variance, and their values may be normalized to be within the range $[-1, 1]$, $[0,1]$, or any other normalization. In some embodiments, if each pixel contains a value for more than one channel (e.g., not merely mono color but RGB, CIE 1931, or HSV), the pre-processing module 160 normalizes the pixel values associated with each channel to be zero mean and have unit variance.

II.B. Labeled Image Data for Training

The training module 170 generates and/or accesses labeled image data, also referred to herein as labeled training data and labeled image data, to train the plant detection model 180. The labeled image data includes bounding boxes that describe the boundaries of plants within the image data, and further includes labels as to which bounding boxes are associated with crops and which are associated with weeds. It may further identify the particular plant species associated with each bounding box. Additionally or alternatively, the labeled image data may specify bounding boxes that identify treated portions of soil, as well as metadata that represents which pixels are associated with treated soil and which are not.

While the embodiment shown in FIG. 1 illustrates the training module 170 being stored by the computer 140 on the mobile treatment platform 100, in practice the training module 170 may be implemented by a remote computer server (not shown) in communication with the mobile treatment platform 100. In such an embodiment, the training module 170 may train the plant detection model 180 on the remote server and the remote server may transmit the trained plant detection model 180 to the mobile treatment platform 100 to be used in the field.

There are several possible sources of labeled image data. In one embodiment, the training module 170 transmits image data to human labelers to generate and respond with the labeled image data. Further, the training module 170 generates additional labeled image data for training the plant detection model 170 by splitting labeled image data into multiple images that may or may not overlap with each other with respect to the physical region of the field captured within those images. This technique may also be referred to as "tiling."

If a labeled image has a higher resolution (i.e., greater number of pixels) than the resolution of image data that is used to train the plant detection model 180, the labeled image may be split into smaller labeled images ("tiles") that are used to train the plant detection model 170. For example, if a labeled image is twice the size of image data used to train the plant detection model 180, the training module 170 may split the labeled image in half and use each half of the labeled image to train the plant detection model 180. This helps ensure consistency between the images used to train the model and the images captured by the camera for use in performing the task at hand (e.g., identifying bounding boxes, located spray patterns).

II.C. Model Tasks

As discussed above, the plant detection model 180 (or a similar model such as a spray box detection model) may be trained to perform one (or more) tasks using one or more submodels.

One task is to identify bounding boxes that specify where plants/crops/weeds/species are physically located on the ground in the field as represented by the image data and the types of the plants within each bounding box. The output of this task is, on a per image basis, the locations and sizes of bounding boxes for plants within images. The output may also include a numerical confidence of the plant detection model 180 in its prediction regarding the bounding box. Together, as will be described in Section III below the bounding boxes, and in some implementations the numerical confidences as well, are used to determine an action taken by the platform 100.

Furthermore, while the present disclosure relates mostly to the detection of plants within image data, the principles of the spray detection model described herein can be adapted to instead implement other types of detection models for the detection of other features within image data as the mobile treatment platform 100 travels through a field. For example, another task is to detect, with a spray box detection model similar to the plant detection model, bounding boxes regarding soil and/or plants that have already been treated by the treatment mechanism 110. This task is similar to the task of identifying bounding boxes for plants, except that in this task the plant detection model 180 is trained on labeled image data regarding locations of liquid treatment rather than labeled image data of plants/crops/weeds/species.

II.D. General Model Structure

At core, the plant detection model 180 is a supervised, machine-learned model that describes a functional relationship between image data and predictions regarding the categorization of image data into bounding boxes (for bounding box related tasks) or some other scheme such as plant species. The plant detection model 180 is generally a parameterized model, whereby a set of parameters representing the learned characteristics of the problem space have associated parameter values that are learned through training based on the labeled training data. The exact form of the parameters and the values depend upon the type of supervised machine learning technique used to implement the model. For example, in the case of a tree-based model, the parameter values may be described as critical values, whereas in the case of a neural network model, these parameter values may be referred to as weights, and the parameters as features.

Generally, the model 180 is trained by inputting the labeled training data, including both the image data and the labels into the function (or set of functions representing the model). The parameter values are then learned, and are stored in conjunction with the function/s. Together, the function/s and parameter values are the digital, structural representation of the model. The model is stored in the computer's 140 memory, and may be accessed when used, for example when the platform 100 is driving through the field. In use, new image data is received and is input into the model, that is to say into the function and associated parameter values, and an output is generated that represents the model's 180 predictions regarding the locations of bounding boxes.

Throughout this description, one general set of implementations of the plant detection model 180 is described as a neural network model for convenience of description and as a prototypical example. However in practice a wide variety of different types of supervised machine learning techniques may be used in place of a neural network, examples of which include but are not limited to tree based models, support vector machines, and so on.

II.D.1. Modified SSD Model

In one embodiment, the plant detection model 180 is based on the Single Shot MultiBox Detector (SSD) model originally described for object detection generally for use with standard images (herein referred to as the "baseline SSD model" for convenience). SSD: Single Shot MultiBox Detector, arXiv:1512.02325 (Dec. 29, 2016), available at https://arxiv.org/pdf/1512.02325.pdf. However, the models 180 described herein implement modifications to the baseline SSD model ("the modified model") that improve the performance of the plant detection model 180, particularly for precision with respect to detection of relatively small bounding boxes that perform poorly in the standard SSD model. These modifications improve the detection of the sizes of bounding boxes that are of relevance to images containing plants, which makes the modified SSD model better for use in performing the tasks identified above.

Figure 3:
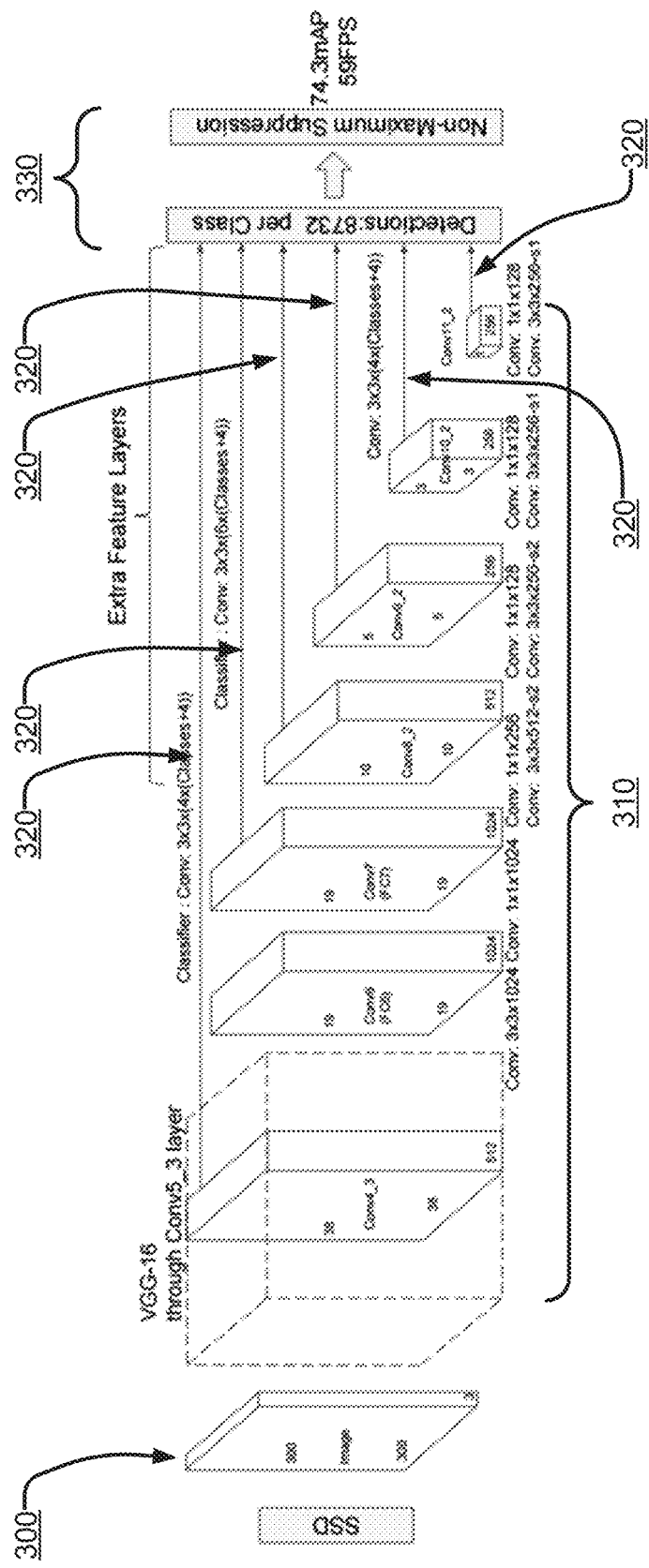
FIG. 3 illustrates the structure of an example Single Shot MultiBox Detector model, in accordance with one embodiment.

The modified SSD model comprises a series of convolutional feature layers of decreasing resolution such that each convolutional feature layer is suited to efficiently identify sequentially larger objects in the image data. FIG. 3 illustrates the structure of the SSD model, including the extra feature layers with decreasing resolution. The modified SSD model generates bounding boxes that identify objects in an input image 300. A bounding box is a set of values that identify a portion of the input image 300 (e.g., the x and y position of the center of a rectangle, the width of the rectangle, and the height of the rectangle). The modified SSD model uses a set of default bounding boxes as guides for determining bounding boxes for the objects. Each feature layer 310 implements a process to generate a set of feature maps 320 for each location in a set of locations within the input of the feature layer (e.g., the input image or feature maps from a previous feature layer). The sets of feature maps 320 generated by each feature layer 310 contain features (e.g., values that identify or quantify the existence of a characteristic of an item to be determined or identified) relating to each class of object that the modified SSD model is trained to detected, each default bounding box used by the modified SSD model, and offsets for a bounding box at each location within the input associated with the generated set of feature maps (again, either the input image or a feature map from a prior feature layer). The offsets describe how a default bounding box can be translated or stretched to fit a bounding box for an object in the original input image.

In an SSD model, the feature map output 320 of each feature layer 310 is used as an input to the next feature layer 310, throughout a sequence of feature layers of decreasing size (e.g., sequential feature layers can have smaller dimensions than previous layers). As a result, the feature layers 310 of progressively smaller sizes are used to more effectively generate bounding boxes on progressively larger objects within the original image and the feature layers 310 of larger size are used to more effective generate bounding boxes on smaller objects within the original image. The outputs 320 of each individual feature layer 310 (e.g., feature maps) are input to a classifier portion 330 (which may be a convolutional neural network or CNN), which uses the feature maps from each feature layer to generate bounding boxes that classify any objects within those feature maps, and which thus classifies any object present within the original image.

Figure 4:
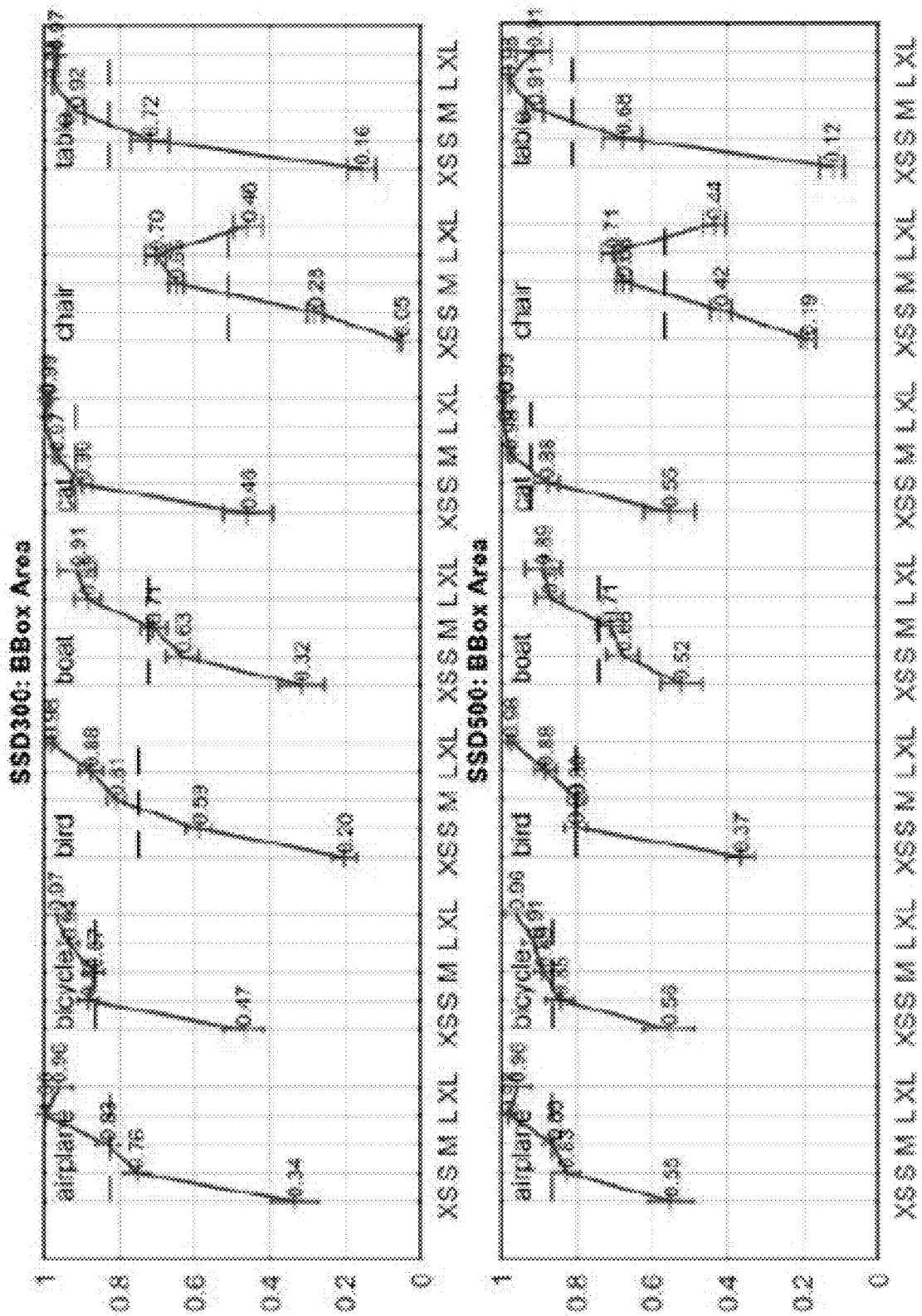
FIG. 4 illustrates two graphs from the original SSD publication that display the accuracy of the "baseline" SSD300 and SSD500 models for extra small, small, medium, large, and extra-large objects.

While the modified SSD model uses feature maps from larger feature layers to identify smaller objects within the original image, the modified SSD model is particularly modified to improve the detection of small objects within the original image because the baseline SSD model struggles to identify smaller objects. FIG. 4 illustrates two graphs from the original SSD paper cited above that display the accuracy of SSD300 and SSD500 for extra small (XS), small (S), medium (M), large (L), and extra-large (XL) objects. The baseline SSD model is insufficient to perform the bounding box tasks described above because SSD is ineffective at generating bounding boxes for smaller objects. FIG. 4 illustrates that SSD300 and SSD500 do not accurately detect XS and some S objects, and is therefore insufficient for the detection of bounding boxes for smaller plants in image data.

II.D.2. SSD Model Improvements

The mobile treatment platform 100 can improve the computer processing performance of the plant detection model 180 by preprocessing image data received from the camera, as described above. Additionally, the plant detection model 180 can be improved on the object detection performance of the standard SSD model (as measured by sensitivity, specificity, accuracy, or another statistical measure) by incorporating one or more modifications to the standard SSD model. The modified SSD model may include any one or more of the following techniques:

Batch Normalization: Values generated by individual layers of the modified SSD model can be normalized to avoid internal covariate shift. Batch normalization can improve the efficiency of the modified SSD model.

Leaky Rectified Linear Units: A leaky rectified linear unit can activate when the input to the unit is a positive value. If the input is not a positive value, the unit outputs a value that equals the input value multiplied by a value between 0 and 1. If the input is a positive value, the unit outputs a value that equals the input value.

Residual Neural Networks: A residual neural network generates output values that are the addition of some function value and an input value. Thus, the residual neural network generates output values that are incremental to the input values. Residual neural networks can improve the efficiency and the accuracy of the modified SSD model.

Custom Anchor Boxes: The default boxes detected by the SSD model may be adjusted to more effectively detect plants and spray patterns of sizes that are expected given a particular PPI in the processed images. For example, the default boxes may be adjusted by reducing the size of the default boxes that are used and may apply the default boxes with greater resolution. By customizing the default boxes, the accuracy of the modified SSD model can be improved, in particular with regards to identifying small objects.

Cleaned Labeled Data: Extraneous data may be removed from the training data for more effective training. For example, the labeled image data may be cleaned or improved by having multiple human operators label the image data. Cleaning the labeled image data can improve the accuracy of the modified SSD model.

Increased Spatial Resolution on Feature Maps: The amount of downsampling performed on image data or on feature maps between layers of the modified SSD model may be less than the downsampling performed in the baseline SSD model, thereby increasing the spatial resolution, and therefore the accuracy, of the feature maps of the modified SSD model.

Spatial Transformers: The dimensions of the image data or the feature maps may be resized between layers of the neural network.

Training Loss Optimization: Many models are trained to reduce the value of a loss function. The loss function used in the modified SSD model may be different from that of the baseline. Training to optimize a loss function can improve the accuracy of the modified SSD model.

Weighted Softmax: Each class of object may be assigned a weight to even out class imbalances for objects detected in image data. Weighted softmax may then be used to more accurately identify the objects within the image data.

Feature Map Fusion: In some embodiments, the modified SSD model uses lower resolution feature maps along with higher resolution feature maps to identify smaller objects within images. As described above, deeper layers of the modified SSD model generate lower resolution feature maps that are used to identify larger objects in images analyzed by the modified SSD model. These lower resolution feature maps also include features that describe larger portions of the image than the higher resolution feature maps generated by shallower layers of the modified SSD model. The modified SSD model may be structured such that the lower resolution feature maps generated by deeper layers of the modified SSD model are combined with the higher resolution feature maps to more effectively identify small objects in shallower layers of the modified SSD model. In some embodiments, the lower resolution feature maps are combined with higher resolution feature maps by concatenating the lower resolution feature maps with the higher resolution feature maps before they are processed by the convolutional neural network.

Background Mining: To improve the performance of the modified SSD model during its operation, the modified SSD model may be trained such that neurons in the neural networks of the modified SSD model are trained to identify background objects in images with only a threshold level of accuracy. Often, images that are used for training the modified SSD model will generally have more background regions for training than foreground regions, due to the proportional breakdown of soil and plants in images. For example, many images of plants in the early stages of growth during which imaging is valuable will contain approximately 10% plant material by surface area coverage relative to 90% surrounding soil. If the model is trained without accounting for this difference, the neurons of the network of the modified SSD model will be over-trained to accurately identify background objects (e.g., soil) at the expense of being able to sufficiently identify foreground objects (e.g., plants).

To improve the performance of the modified SSD model in recognizing foreground objects, the neurons of the neural networks may be trained using a subset of background objects available in the training images. When the neurons of the modified SSD model are being trained based on a new background object, neurons with a background-object-identification accuracy above a threshold value may not be trained based on the new background object. In other words, if a neuron can identify background objects with an accuracy that exceeds a threshold value, the neuron may not be trained based on new background objects from labeled training images. These neurons may continue to be trained based on new foreground objects from labeled training images, thereby improving the overall ability of the modified SSD model to identify foreground objects.

Furthermore, some portions of the training images may be labeled as foreground objects or background objects with differing confidence levels by the feature maps of the modified SSD model prior to entry to the CNN of the modified SSD model. For example, the center of a plant may be labeled a foreground object with a high confidence level whereas the boundary area between the edge of a leaf and the background may be labeled a foreground object with a low confidence level. The modified SSD model may be trained with only objects from training images with high confidence levels as being either a foreground object or a background object. The modified SSD model is thereby trained using more accurate representations of foreground objects and background objects, which improves the ability of the modified SSD model to identify and distinguish foreground objects and background objects in images.

Training Augmentations: Additional training images for the modified SSD model may be generated by augmenting existing training images using image augmentations that replicate real-world phenomena. Real-world phenomena may impact images captured by the mobile treatment platform during operation. For example, the color temperature of images may be impacted by the time of day at which the images are taken. However, due to the expense of operating mobile treatment platforms in fields of crops to capture training images, it may not be possible to collect sufficient training images to replicate all possible values of various real-world phenomena that may actually be experienced during the operation of the mobile treatment platform in the field. Training the modified SSD model using only images representing as-captured environmental conditions limits the ability of the modified SSD model to identify objects in conditions that do not match those in which the training images were captured.

The training images used to train the modified SSD model may be augmented (and in some cases, duplicated and then the duplicates are augmented) to replicate real-world phenomena that can impact images captured by the mobile treatment platform during operation. For example, one or more of the following augmentations may be applied to labeled training images:

Color Temperature: the color temperature of the training images may be adjusted to replicate differences in color temperatures that may occur at different times of the day (e.g., sunrise, sunset, or midday) or with different lighting conditions (e.g., sunlight or artificial lights);

Two-Dimensional Blur: a two-dimensional blur may be applied to training images to replicate blurring caused by a change in the distance of the camera from the ground;

One-Dimensional Blur: a one-dimensional blur may be applied to training images to replicate blurring caused by motion of the mobile treatment platform;

Gain: the gain of training images may be adjusted to replicate over- or under-exposure that may occur when the mobile treatment platform captures images;

Noise: noise may be applied to the training images to replicate conditions that can impact the quality of images captured by the camera (e.g., dirty lenses, fog/mist, or poor-quality cameras);

Rotation/Flipping: the training images may be rotated or flipped to replicate changes to the direction of travel of the mobile treatment platform or the orientation of the camera on the mobile treatment platform;

Pixel Jitter: the objects identified in the training images may be moved slightly (e.g., by a few pixels) to ensure that predictions made by the modified SSD model are independent of the absolute location of the plants in the images.

Sets of new training images may be generated by applying the augmentations to the original training images. In some embodiments, each set of new training images may correspond to one or more of the augmentations that were applied to the original training images to generate the set of new training images. By training the modified SSD model based on the augmented training images, the modified SSD model is better able to detect objects in images captured under the conditions of the augmented images.

Figure 5:
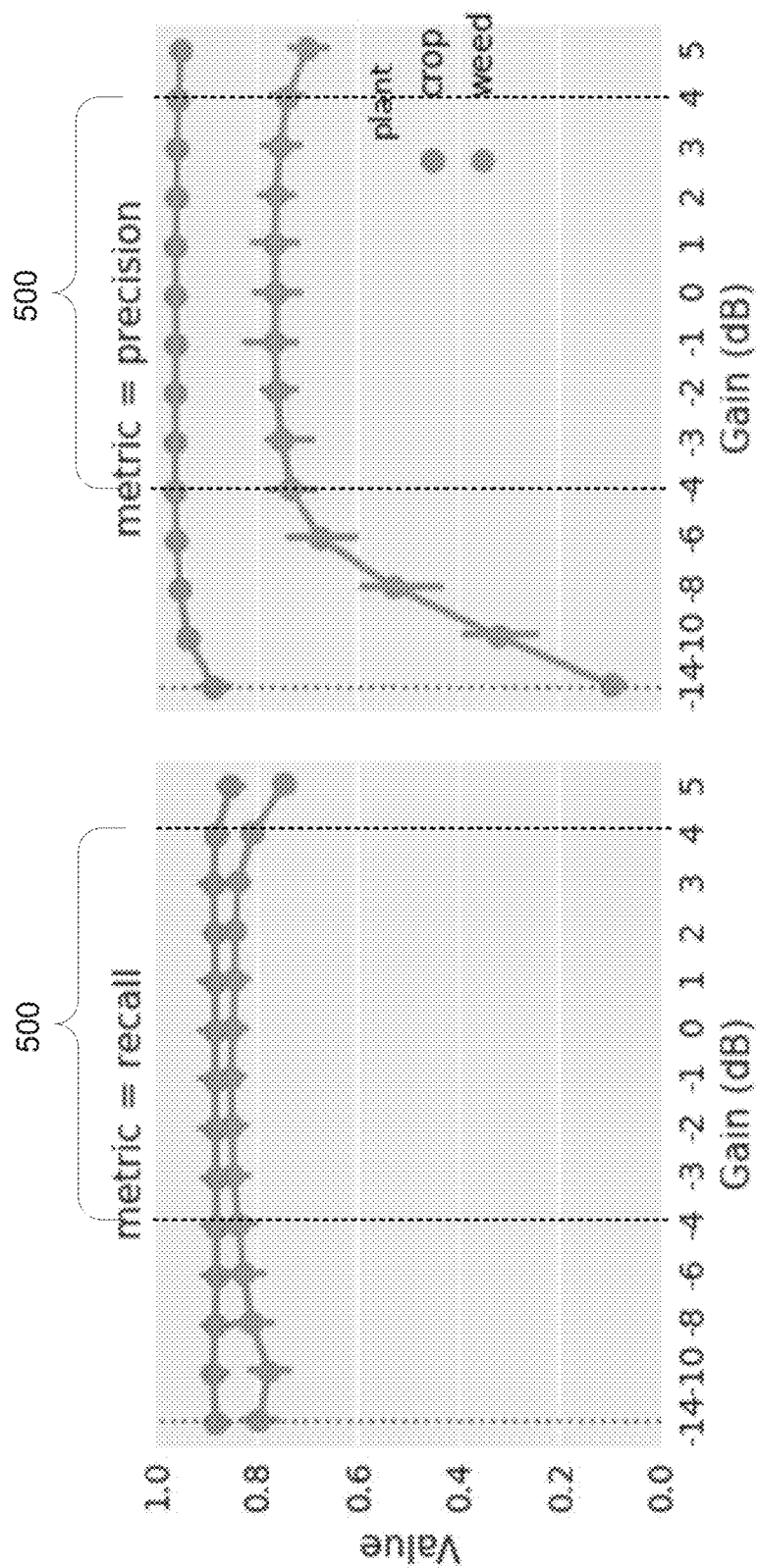
FIGS. 5 and 6 illustrate two graphs of the performance of a modified SSD model for different training augmentation parameters, in accordance with some embodiments.
Figure 6:
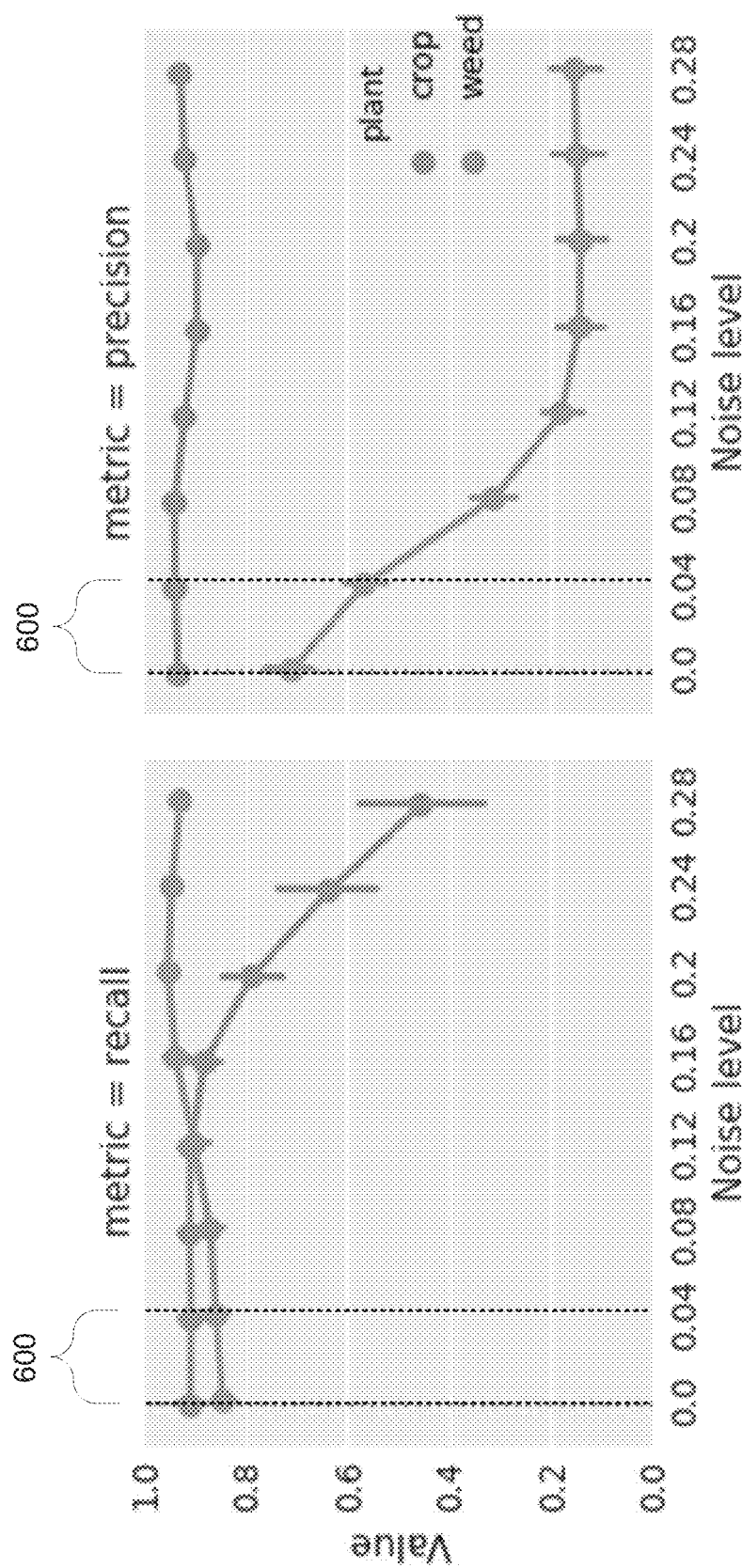

In some embodiments, the augmentations are applied to the original training images using augmentation parameters. The augmentation parameters configure how an augmentation is applied to the training images. For example, for gain augmentations, the degree to which the gain is adjusted may be specified by gain augmentation parameters. Listed below is a non-exhaustive is of example ranges of training augmentation parameters that may be used for augmentations applied to the original training images:

Color Temperature: 2000K-9500K
1D or 2D Blur: 1 pixel-15 pixels
Gain: −14 dB-5 dB
Noise: 0.00-0.28 noise level An augmentation may be applied to the original training images more than once with different augmentation parameters to generate sets of new training images. In some embodiments, a pre-determined range of augmentation parameters are used for multiple applications of an augmentation. The pre-determined range of augmentation parameters may be a range of augmentation parameters that minimize the likelihood that the performance of the modified SSD model will decrease due to over-training. FIG. 5 illustrates two graphs of the performance of a modified SSD model for different training augmentation parameters for a gain augmentation, in accordance with some embodiments. More specifically, FIG. 5 illustrates the recall and precision performance of a modified SSD model with different gain augmentation parameters. The gain augmentation parameters may be limited to a pre-determined range 500 of gain augmentation parameters that ensure that the modified SSD model maintains a sufficient level of performance while ensuring that the modified SSD model is trained to identify crops and weeds in images impacted by real-world phenomena. FIG. 6 also illustrates two graphs of the performance of a modified SSD model for different training augmentation parameters for a noise augmentation, and illustrates a pre-determined range 600 of noise augmentation parameters that may be used to generate new training images.

Uncertainty-Based Retraining: The modified SSD model may be retrained based on the uncertainty of the results generated by the modified SSD model. For example, in some embodiments, a subset of neurons used by the modified SSD model may be selected to be "dropped" from identifying objects in an image. Dropped neurons are not used by the modified SSD model to identify objects in the image. The objects identified by the modified SSD model without using the selected neurons can be compared to objects identified by the modified SSD model with using the selected neurons to determine whether the modified SSD model has been sufficiently trained to identify the objects. In some cases, uncertainties for the identified objects identified with and without the selected neurons may be compared to determine whether the modified SSD model has been sufficiently trained to identify the objects. If the objects identified or uncertainties generated by the modified SSD model without the selected neurons differ significantly (e.g., greater than a threshold difference) from the objects identified or uncertainties generated by the modified SSD model with the selected neurons, then the image for which the modified SSD model identified objects may be used to further train the modified SSD model. In some embodiments, images used to further train the modified SSD model are passed through a labeling process whereby the images are labeled for training (e.g., the images may be transmitted to a human labeler for manual labeling).

Alternatively or additionally, objects identified or uncertainties generated by the modified SSD model may be compared to objects identified or uncertainties generated by a teacher model. The teacher model is a model that can more accurately identify objects in images captured by the mobile treatment platform, though the teacher model may be more computationally intensive than the modified SSD model. If the objects identified or uncertainties generated by the modified SSD model differ significantly from objects identified or uncertainties generated by the teacher model, then the image for which the objects were identified may be used to further train the modified SSD model.

II.D.3. Performance of Example Modified SSD Models

A variety of these techniques and tools may be employed to improve the modified SSD model relative to the standard SSD model. Which techniques are used in an implementation of the platform may vary based on the desired run time, desired driving speed of the platform 100 through the field, desired accuracy in generating bounding boxes, etc. Thus, the specific design of the plant detection model 180, and in one set of embodiments the modified SSD model, may vary by desired implementation. Table 1 illustrates example modified SSD models along with a comparison of their accuracy relative to the baseline SSD model when the models are executed on a Jetson TX2:

TABLE 1

| Techniques | Accuracy | Runtime |
| --- | --- | --- |
| Standard SSD | 42% | 600 ms |
| SSD, Batch Normalization, Leaky ReLU, and Residual Networks | 57% | 190 ms |
| SSD, Batch Normalization, Leaky ReLU, Residual Networks, Custom Anchor Boxes, Cleaned Labeled Data, and Increasing Spatial Resolution in Feature Maps | 77% | 175 ms |
| SSD, Batch Normalization, Leaky ReLU, Custom Anchor Boxes, Cleaned Labeled Data, Increasing Spatial Resolution in Feature Maps, and Training Loss Optimization | 85% | <150 ms |

Thus, various combinations of these techniques can improve on the baseline SSD model.

Figure 7A:
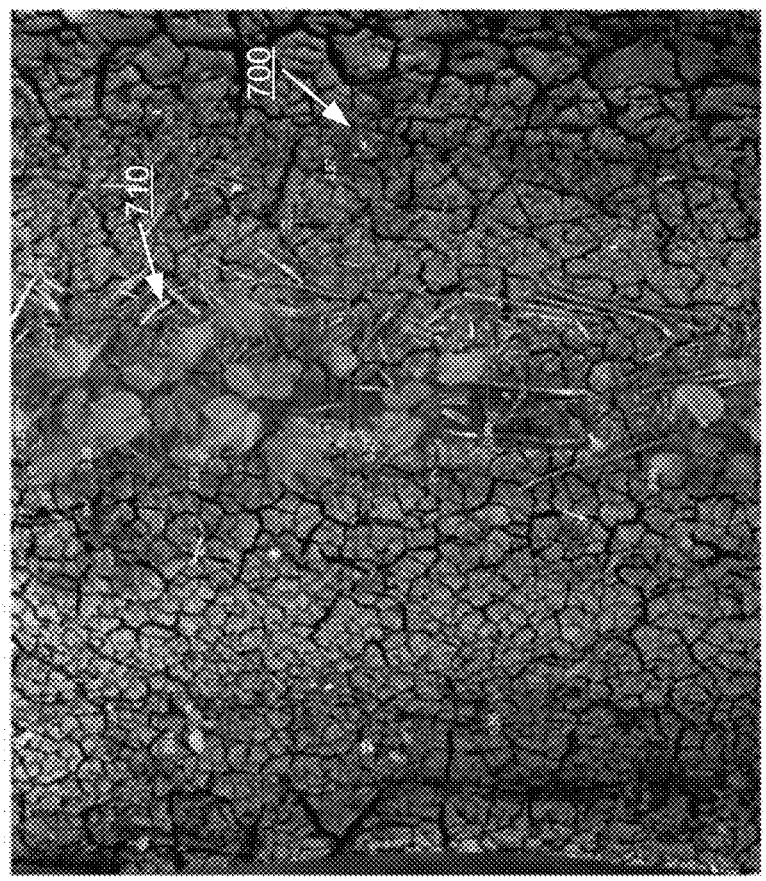
FIGS. 7A and 7B illustrate improvements of a plant detection model from the baseline SSD model for generating bounding boxes, in accordance with one embodiment.
Figure 7B:
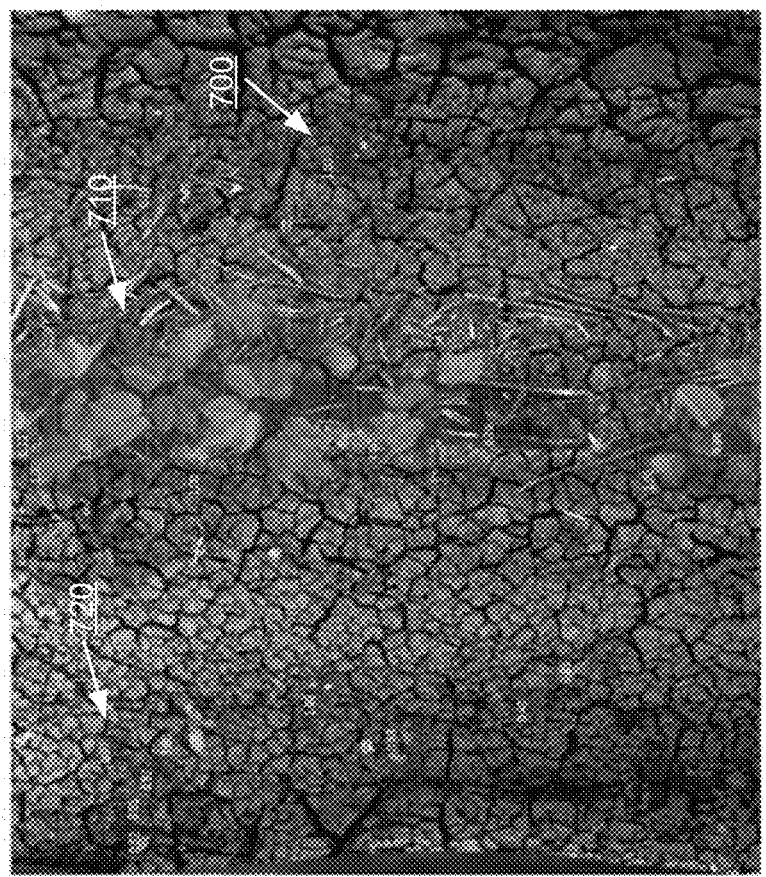

FIGS. 7A and 7B illustrate this improvement in the detection of weed plants 700 around crops 710 treated by the mobile treatment platform, in accordance with some embodiments. FIG. 7B uses a conventional SSD neural network model to detect crops 710 and weed plants 700. FIG. 7A uses an implementation of the modified SSD model to accomplish the same task. The modified SSD model identifies additional weed plants 720 that are not identified by the conventional neural network model.

Figure 7C:
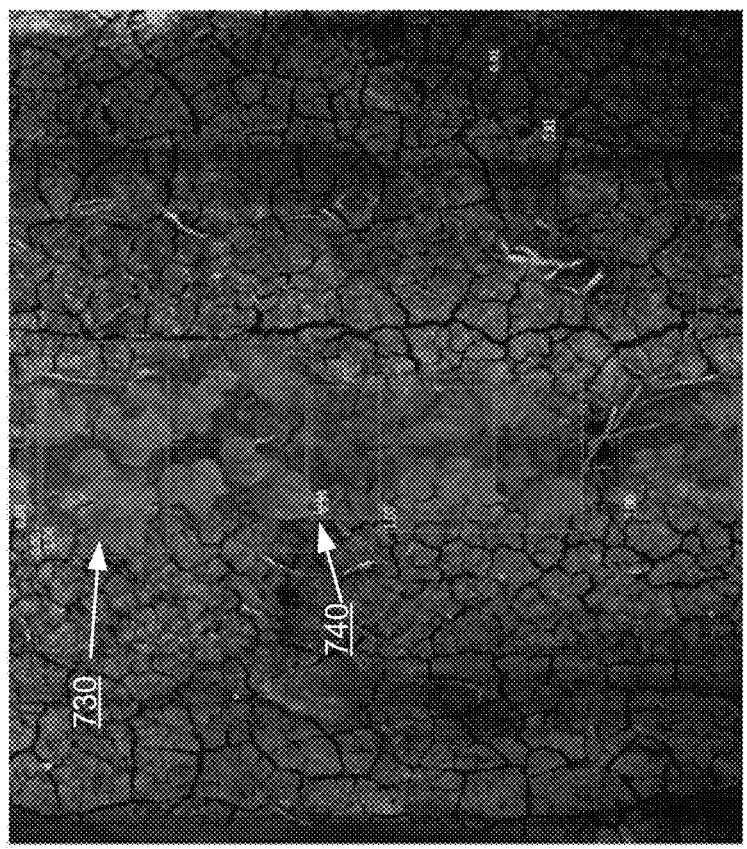
FIGS. 7C and 7D illustrate improvements of a plant detection model from the baseline SSD model for generating bounding boxes, in accordance with another embodiment.
Figure 7D:
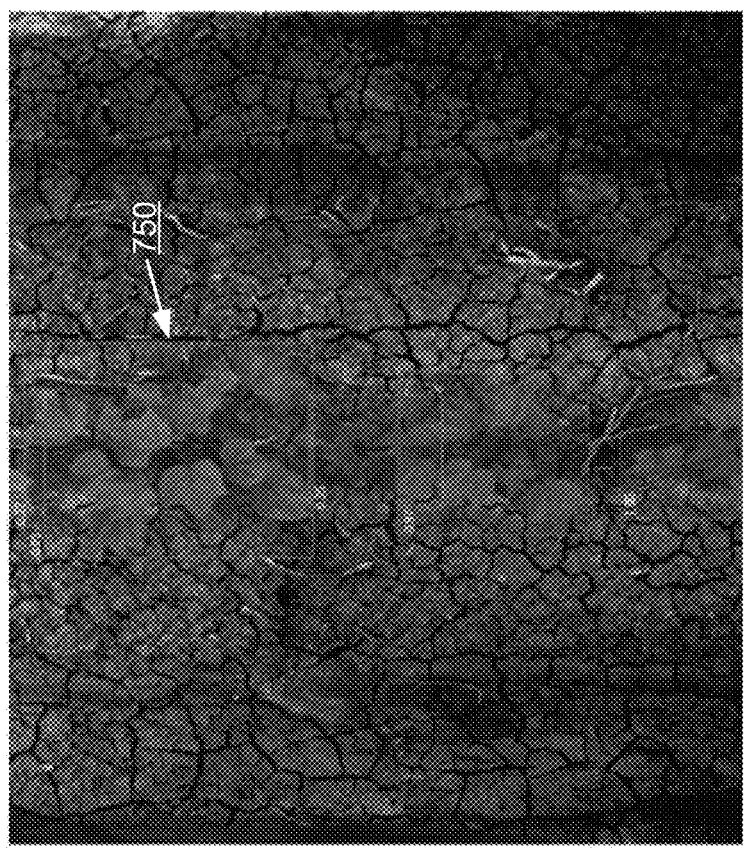
Figure 7F:
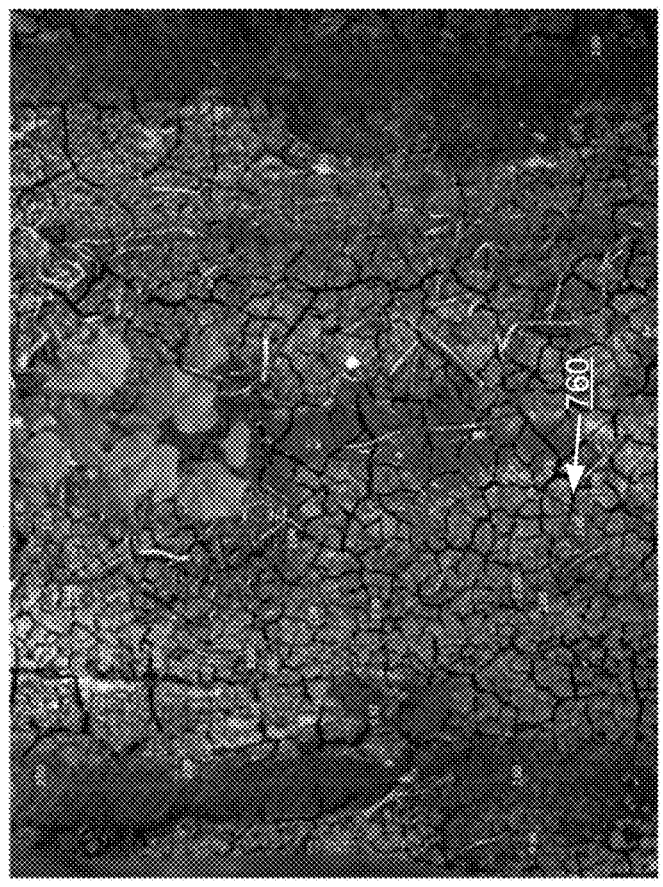
FIGS. 7E and 7F illustrate improvements of a plant detection model from the baseline SSD model for generating bounding boxes, in accordance with yet another embodiment.
Figure 7E:
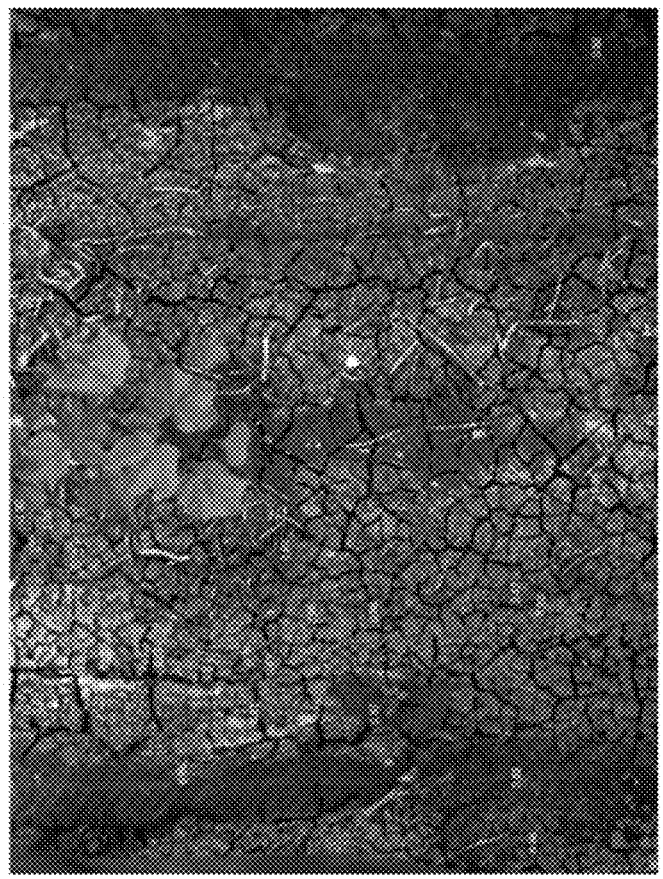

FIGS. 7C and 7D illustrate similar improvements. Embodiments of the modified SSD model identify additional crop plants 730 and weed plants 740 in FIG. 7C from those identified 750 by the baseline SSD model in FIG. 7D. Furthermore, FIG. 7F illustrates additional weed plants that are identified by bounding boxes 760 generated by the modified SSD model that are not generated by the baseline SSD model, as illustrated in FIG. 7E.

Additional tests of some embodiments of the modified SSD model have illustrated the improvements to conventional SSD models that can be achieved by improving the training of the modified SSD model as described herein (e.g., training augmentation). The tests of the modified SSD model use images of plants in a field with a variety of different parameters, such as different crop growth stages, weed pressures, soil conditions, till and un-tilled soil, time of day, and plant health conditions. These parameters ensure that the test images cover a broad set of scenarios that the mobile treatment platform may encounter in the field. An embodiment of the modified SSD model and a conventional SSD model identify crops and weeds in the test set of images and the objects identified by the modified SSD model and the conventional SSD model are compared. The modified SSD model was found to have an approximate improvement in weed identification performance of 20% and an approximate improvement in crop identification performance of 15%.

More generally, although the example modified SSD models above use multiple layers of downsampling of the input images/feature maps to separately identify bounding boxes of various sizes using neural networks specifically at each such layer, in practice this multiple-layer identification can be applied using a different technique other than a neural network at each layer. For example, multiple downsampled versions of the original input image or feature maps created based on the original image may be input into other types of machine learning models. The downsampling between layers preserves time efficiency, and each layer applied is still applied to a model trained to process images at that level of downsampling, preserving accuracy.

II.F. Spray Box Detection

As mentioned above, the plant detection model 180 may be configured to carry out the task of identifying bounding boxes for portions of soil that have already been treated by the treatment mechanism 110. This model may be referred to as a spray box detection model, for clarity, rather than as a plant detection model 180. However, in implementation it is largely similar to the plant detection model 180 in overall functionality. The significant difference between the two is what is to be detected in the image data. Any of the techniques described above for improving the baseline SSD model for plant bounding box detection mentioned above may also be used to adjust a similar spray box detection model, where a similar principle applies that an implementer may choose which specific techniques to apply based on a desired level of sensitivity, specificity, and efficiency that is desired. FIGS. 8A, 8B, and 8C illustrate an example implementation of the model identifying bounding boxes 800 for treated patches of soil on dark soil, light soil, and with a light leak underneath a shroud used to normalize light, respectively. In one example embodiment, the model is specifically designed to more heavily penalize a location mistake.

III. Example Uses

III.A. Treatment Instructions

The treatment application module 190 provides instructions to the treatment mechanism 110 to treat plants in the field based on the output of the plant detection model 180. The treatment application module 190 can provide instructions to the treatment mechanism 110 to activate or deactivate the treatment mechanism 110. The treatment application module 190 can also provide instructions that direct where the treatment mechanism 110 applies treatment (e.g., instructions to translate or tilt the treatment mechanism 110).

The treatment application module 190 uses the bounding boxes generated by the plant detection model 180 to treat plants identified by the bounding boxes. For example, the treatment application module 190 can provide instructions to the treatment mechanism 110 to apply fertilizer to areas identified by boundary boxes as representing crops. As another example, the treatment application module 190 can provide instructions to the treatment mechanism 110 to apply an herbicide to areas identified by bounding boxes as representing weeds. The treatment application 190 also can apply treatment to plants based on bounding boxes that identify where the treatment mechanism 110 has previously treated.

III.B. Generating Bounding Boxes for Plants

Figure 9:
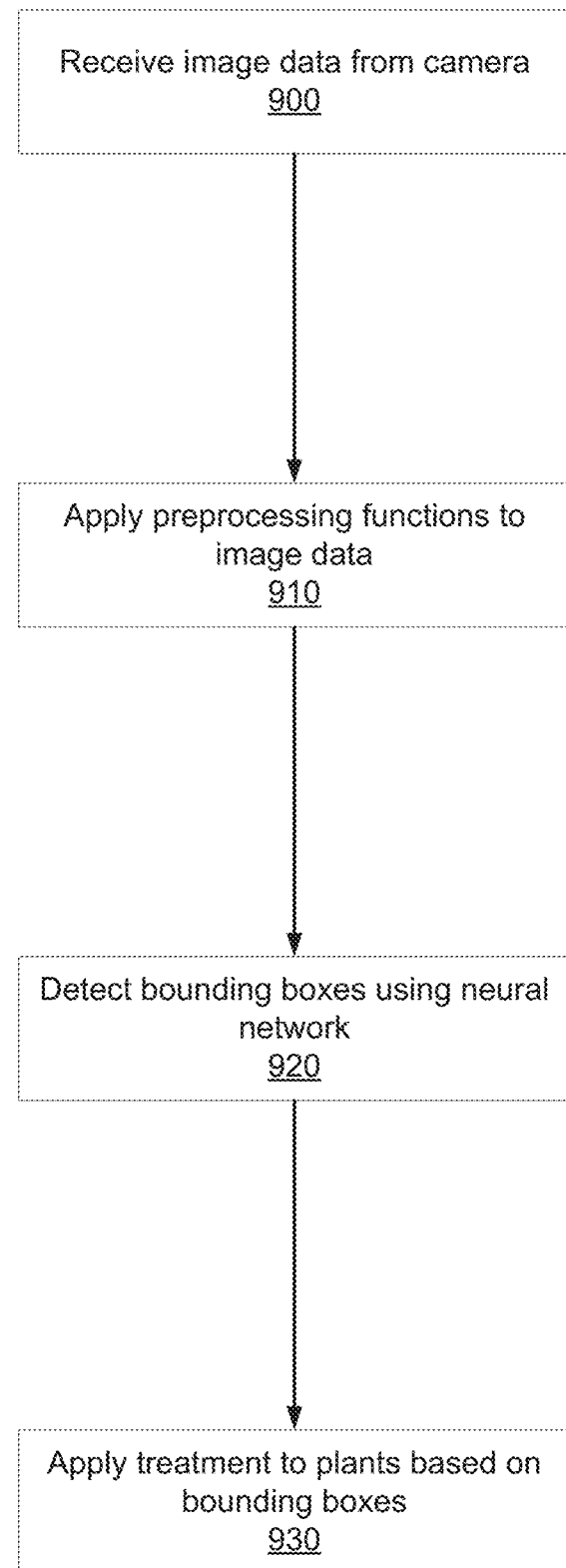
FIG. 9 is a flowchart illustrating an example method for identifying bounding boxes for plants, in accordance with one embodiment.

FIG. 9 is a flowchart illustrating a method for identifying bounding boxes for plants, in accordance with one embodiment. The mobile treatment platform receives 900 image data from a camera of the mobile treatment platform. The camera can capture image data of crops as the mobile treatment platform as the mobile treatment platform travels through a field of crops. The mobile treatment platform applies 910 pre-processing steps to the received image data. The mobile treatment platform detects 920 bounding boxes using a plant detection model. The bounding boxes identify portions of the image data that represent plants. The bounding boxes can also identify the species of the plant, as well a confidence that the bounding boxes are accurate. The mobile treatment platform applies 930 treatment to the plants in the fields based on the bounding boxes. For example, the mobile treatment platform may use the bounding boxes to apply fertilizer to crops the field and to apply herbicide to weeds in the field as the mobile treatment platform travels through the field.

III.D. Generating Bounding Boxes for Treated Areas

Figure 10:
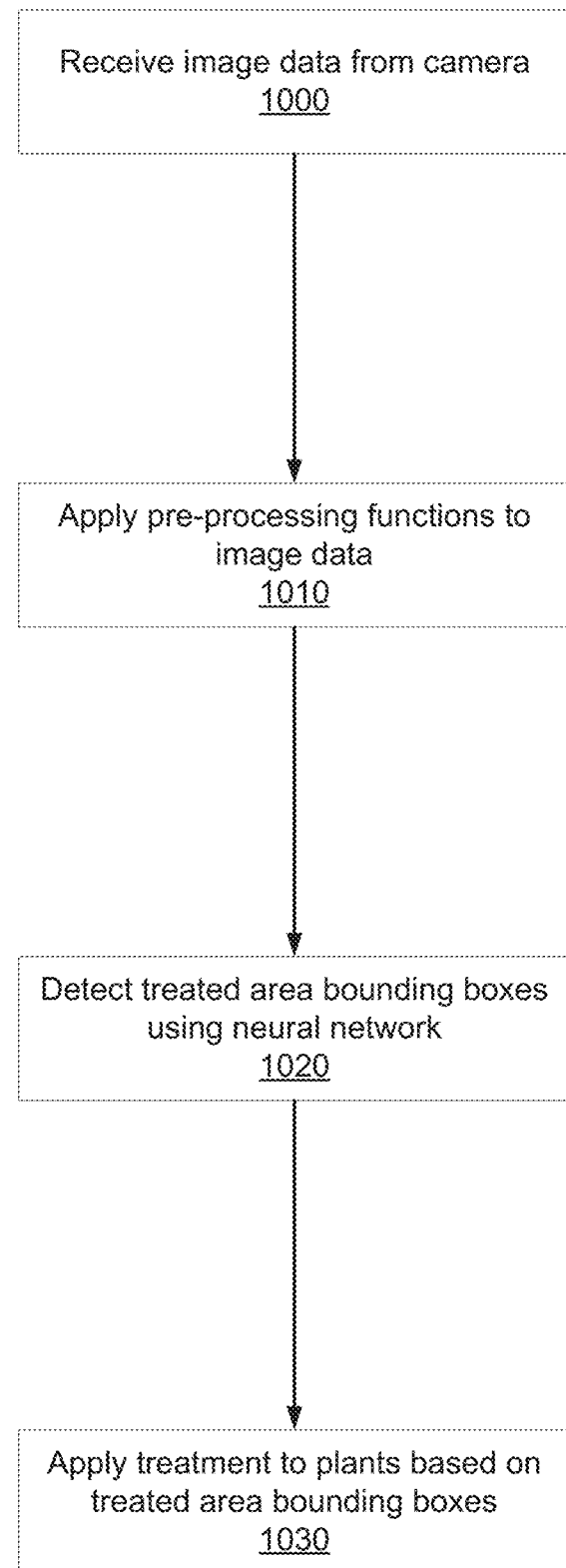
FIG. 10 is a flowchart illustrating an example method for identifying bounding boxes treated areas, in accordance with one embodiment.

FIG. 10 is a flowchart illustrating a method for identifying bounding boxes for treated areas, in accordance with some embodiments. The mobile treatment platform receives 1000 image data from a camera of the mobile treatment platform. The camera can capture image data of crops as the mobile treatment platform as the mobile treatment platform travels through a field of crops. The mobile treatment platform applies 1010 pre-processing steps to the received image data. The mobile treatment platform detects 1020 bounding boxes using a spray box detection model. The mobile treatment platform uses the spray box detection model to generate bounding boxes that identify portions of the image data that represent treated areas. The bounding boxes can also specify the confidence that the bounding boxes are accurate. The mobile treatment platform applies or does not apply 1030 treatment to the plants in the fields based on the bounding boxes.

In one embodiment, the bounding boxes detected by the spray box detection model are used in conjunction with the bounding boxes detected by the plant detection model. The mobile treatment platform may initially identify a set of bounding boxes for where to apply a treatment using the spray detection model. The mobile treatment platform may then further use the bounding boxes detected by the spray box detection model avoid applying treatment to an area that has already been treated. This may be accomplished by removing from consideration for treatment those areas of the field that although within a bounding box detected by the plant detection model, are also within a bounding box detected by the spray box detection model.

IV. Additional Considerations

While the disclosure herein primarily describes a modified SSD model, the principles and modifications herein may be applied to other bounding box models, such as RCNN or YOLO. Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

The computer 140 discussed above may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which are set forth at least in part in the following claims.

What is claimed is:

1. A farming machine comprising:
    a treatment mechanism mounted to the farming machine, the treatment mechanism configured to treat areas in a field;
    an image sensor mounted to the farming machine, the image sensor configured toe capture images of the field;
    a computer; and
    a computer readable medium comprising instructions that, when executed by the computer, cause the computer to perform operations comprising:
        treating areas in the field by the treatment mechanism mounted as the farming machine moves through or over the field;
        receiving a first image of the field captured by the image sensor, the first image including image data representing areas of the field that received treatments by the treatment mechanism;
        applying a treatment detection model to a second image based on the first image, the treatment detection model configured to:
            generate a bounding box within the second image that encloses image data representing a first area of the areas of the field that received treatments by the treatment mechanism; and
            determining, based on the bounding box enclosing the image data, the first area of the field received a treatment by the treatment mechanism.

2. The farming machine of claim 1, wherein the second image is a processed version of the first image.

3. The farming machine of claim 1, wherein the operations further comprise:
    applying a plant detection model to the second image, the plant detection model configured to:
        generate plant bounding boxes within the second image that enclose image data representing areas of the field with plants; and
    treating, with the treatment mechanism, areas of the field that: (a) are enclosed by the plant bounding boxes in the second image and (b) exclude the first area.

4. A method comprising:
    treating areas in a field by a treatment mechanism mounted on a treatment platform moving through or over the field;
    receiving a first image of the field captured by an image sensor, the first image including image data representing areas of the field that received treatments by the treatment mechanism;
    applying a treatment detection model to a second image based on the first image, the treatment detection model configured to:
        generate a bounding box within the second image that encloses image data representing a first area of the areas of the field that received treatments by the treatment mechanism; and
    determining, based on the bounding box enclosing the image data, the first area of the field received a treatment by the treatment mechanism.

5. The method of claim 4, wherein the treatment detection model is further configured to generate a second bounding box within the second image that encloses image data representing a second area of the field that did not receive a treatment by the treatment mechanism.

6. The method of claim 4, wherein the treatment detection model is further configured to determine a confidence level that the bounding box is accurate.

7. The method of claim 4, wherein determining, based on the bounding box enclosing the image data, the first area of the field received the treatment by the treatment mechanism comprises:
    determining a location of the bounding box in the second image;
    identifying a physical location of the first area in the field based on the location of the bounding box in the second image; and
    determining the first area of the field received the treatment based on the identified physical location.

8. The method of claim 4, wherein the second image is a processed version of the first image.

9. The method of claim 4, further comprising:
    subsequent to determining the first area of the field received the treatment, treating additional areas of the field excluding the first area.

10. The method of claim 4, further comprising:
applying a plant detection model to the second image, the plant detection model configured to:
generate plant bounding boxes within the second image that enclose image data representing areas of the field with plants; and
treating, with the treatment mechanism, areas of the field that: (a) are enclosed by the plant bounding boxes in the second image and (b) exclude the first area.

11. The method of claim 4, wherein treating areas in the field comprises treating plants in the field by the treatment mechanism.

12. The method of claim 4, wherein treating areas in the field comprises spraying at least one of: plants or soil in the field.

13. The method of claim 4, wherein the bounding box within the second image encloses image data representing a patch of soil that received a treatment.

14. A non-transitory computer-readable storage medium comprising stored instructions that, when executed by a computer, cause the computer to perform operations comprising:
treating areas in a field by a treatment mechanism mounted on a treatment platform moving through or over the field;
receiving a first image of the field captured by an image sensor, the first image including image data representing areas of the field that received treatments by the treatment mechanism;
applying a treatment detection model to a second image based on the first image, the treatment detection model configured to:
generate a bounding box within the second image that encloses image data representing a first area of the areas of the field that received treatments by the treatment mechanism; and
determining, based on the bounding box enclosing the image data, the first area of the field received a treatment by the treatment mechanism.

15. The non-transitory computer-readable storage medium of claim 14, wherein the treatment detection model is further configured to generate a second bounding box within the second image that encloses image data representing a second area of the field that did not receive a treatment by the treatment mechanism.

16. The non-transitory computer-readable storage medium of claim 14, wherein the treatment detection model is further configured to determine a confidence level that the bounding box is accurate.

17. The non-transitory computer-readable storage medium of claim 14, wherein determining, based on the bounding box enclosing the image data, the first area of the field received the treatment by the treatment mechanism comprises:
determining a location of the bounding box in the second image;
identifying a physical location of the first area in the field based on the location of the bounding box in the second image; and
determining the first area of the field received the treatment based on the identified physical location.

18. The non-transitory computer-readable storage medium of claim 14, wherein the second image is a processed version of the first image.

19. The non-transitory computer-readable storage medium of claim 14, further comprising:
subsequent to determining the first area of the field received the treatment, treating additional areas of the field excluding the first area.

20. The non-transitory computer-readable storage medium of claim 14, further comprising:
applying a plant detection model to the second image, the plant detection model configured to:
generate plant bounding boxes within the second image that enclose image data representing areas of the field with plants; and
treating, with the treatment mechanism, areas of the field that: (a) are enclosed by the plant bounding boxes in the second image and (b) exclude the first area.

* * * * *